Figure 1:
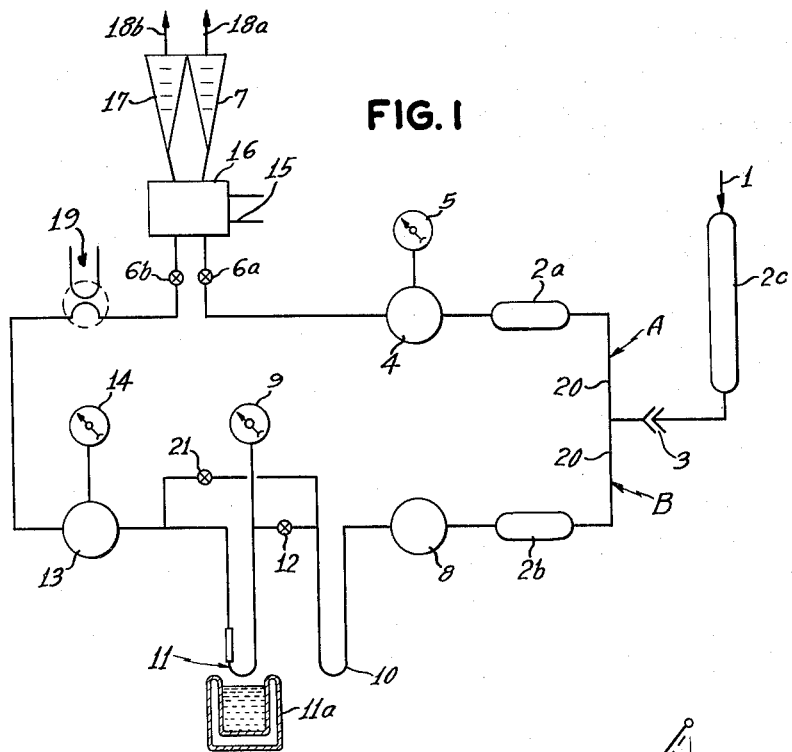

Oct. 12, 1965  A. J. HALEY, JR  3,211,006
CONTINUOUS FLOW METHOD AND APPARATUS FOR DETERMINING
ADSORPTION ISOTHERMS OF SOLID MATERIALS
Filed Sept. 5, 1961  3 Sheets-Sheet 1

INVENTOR.
Alfred J. Haley, Jr.
BY
ATTORNEY

United States Patent Office ──

3,211,006
Patented Oct. 12, 1965

3,211,006
CONTINUOUS FLOW METHOD AND APPARATUS FOR DETERMINING ADSORPTION ISOTHERMS OF SOLID MATERIALS
Alfred J. Haley, Jr., Colonia, N.J., assignor to Engelhard Industries, Inc., Newark, N.J., a corporation of Delaware
Filed Sept. 5, 1961, Ser. No. 136,412
30 Claims. (Cl. 73—432)

This invention relates to an improved method and apparatus for determination of surface characteristics of solids by means of a continuous flow of gas. More particularly the method involves the use of a gaseous mixture of constant composition, the pressure of which can be varied and controlled. Apparatus suitable for carrying out this method comprises non-fragile tubular structures capable of withstanding elevated pressure. A means is provided for continuously and accurately measuring and recording the quantity of gas adsorbed on or desorbed from a solid over a wide range of relative pressures of adsorbate. From such data pore volume distributions, pore diameter distributions, total pore volumes, and surface areas may be determined by known methods.

An accepted standard method of determining surface area and pore characteristics of solids is by gas adsorption and desorption at low temperatures, i.e., temperatures near the boiling point of the adsorbate. This technique involves a determination of the quantity of gas adsorbed on or desorbed from a solid under constant temperature conditions. The volume of adsorbate condensed on the porous solid under various relative pressures of the adsorbate up to the normal pressure is plotted as an adsorption isotherm. This is determined in sequence as an adsorption plot when the adsorbate relative pressure is increased, followed by a desorption plot when it is decreased. Some hysteresis is frequently found under high relative pressure conditions so that adsorption volumes in the adsorption plot may be lower than adsorption volumes in the desorption plot for a given relative pressure. The reason for this has been variously interpreted. It is generally agreed that the desorption plot volumes of adsorbed gas more accurately measure porous solid surface characteristics.

By the expression surface characteristics of solids is understood not only the solid's external surface but also in the case of porous materials their extensive internal surface and pore structure. An adsorbate gas is physically adsorbed on such materials both by adsorption on the internal wall surfaces in a layer which may be many molecules thick and by capillary condensation in the pores of the solid. In developing adsorption isotherms, as understood in the present discussion, no distinction is made between adsorption on the walls and condensation in the capillaries. It is understood that the adsorption on a porous solid at low gas pressures relative to saturation is mainly on wall surfaces. As the adsorbate gas pressure approaches saturation the small pores followed by the large pores are progressively filled by capillary condensation.

There is a considerable amount of literature devoted to the use of adsorption isotherm data to evaluate surface area, pore volume and pore-size distribution. The Brunauer-Emmett-Teller (BET) equation can be used for calculating the surface area and the Barrett-Joyner-Halenda (BJH) method for calculating pore volume and pore-size distribution for adsorbents. Because of the large amount of comparative data available with nitrogen together with its inertness and convenience for use, it is often used as the adsorbate.

Techniques have been developed for obtaining pressure-volume data in a static system. For each determination a small measured volume of adsorbate gas is introduced into a constant volume adsorption space and allowed to come to equilibrium, at which time the volume of the gas at equilibrium is determined. The volume of gas absorbed is then calculated. This static method, however, involves the use of unwieldy and generally fragile apparatus because of vacuum requirements. A further disadvantage is that each measurement is frequently slow, since it may take several hours for a system to reach equilibrium. Also, it is difficult to predetermine the volume of adsorbate to be added in order to obtain values in the desired range of relative pressure. In this connection it should be noted that the BET equation for determining surface area is only valid at relatively low partial pressures of the adsorbate, i.e., in general, only in the range of the isotherm which expresses the formation of the monolayer.

To overcome these difficulties techniques have been suggested involving the continuous flow of gas and also a specific adaptation of gas chromatography. For example, F. M. Nelson and F. T. Eggertsen have published in Anal. Chem. 30, 1387 (1958) a description of a practical way for determination of surface areas by a continuous flow method, using a thermal conductivity cell as a detector for the amount of adsorption. The continuous flow method used by Nelson and Eggertsen was carried out at a pressure slightly over 1 atmosphere using a system constructed in part of glass. This had advantages of simplicity of equipment and operation as compared to the high vacuum apparatus commonly used in BET determinations of surface areas.

Determination of adsorption isotherms of porous solids by continuous flow methods has been considered by various people. Instruments suitable for indicating adsorption on the sample and desorption from it include ionization, gas density, and infrared or radiation meters. However, the preferred instrument is a thermal conductivity cell, which has advantages of ruggedness, economy, and high sensitivity to small changes in adsorption. Changes in the gas stream composition, and hence by difference changes in the adsorbed gas, may be determined continuously by such instruments.

Thermal conductivity cells are widely used in gas chromatography, in which the rate of elution to the thermal conductivity cell of portions of a vapor sample from an adsorbent material provides analytical information as to its composition. The sample is dispersed in a carrier gas with a thermal conductivity varying widely from the sample, in order to provide high sensitivity of thermal conductivity analysis. As thermal conductivity is generally in inverse proportion to gas molecular weight, hydrogen and helium have much higher thermal conductivity than all other gases. They also have the lowest boiling points and therefore the lowest tendency of all gases to adsorb physically on porous solids.

A combination of these two reasons makes helium usually the carrier gas of choice when thermal conductivity cells are used to analyze unadsorbed amounts of an adsorbable gas passing over a porous solid—by difference the amount of adsorbable gas on the solid is determined. Hydrogen also may be used as the carrier gas provided no problem from its reactivity is encountered. As nitrogen has been widely studied as an adsorbate at liquid nitrogen temperature it is desirably used as adsorbate in continuous flow studies, with helium or possibly hydrogen as carrier gas.

In a conventional method of obtaining data for the BJH calculation of complete adsorption isotherms of solids, adsorption measurements for a pure gas at about its normal boiling point are made with a static high vacuum system progressively from low pressure of the gas up to about one atmosphere, followed by desorption measurements progressively down to low pressure of the gas. As previously stated the desorption portion of the adsorption isotherm gives the most reliable data for calculation of surface characteristics of the solid. Such surface characteristics can be shown as plotted curves for the adsorption isotherm, particularly its desorption branch. Information obtained in this way includes surface areas according to the BET equation, total pore volumes, and pore volume and pore diameter size distribution.

The raw data from which such adsorption isotherm curves are plotted includes residual gas confined in a definite volume as measured by its pressure-volume relationship, the balance of the gas being adsorbed on the porous solid. Corresponding to each relative pressure, $P/P_s$, of an adsorbate the pore volume of a solid of pores over a certain mean size can be calculated. In the ratio $P/P_s$. P is understood to be the partial pressure of the adsorbate and $P_s$ its saturation pressure. All pores under the specified mean size will be filled with condensate at the given pressure. Pore size distribution is then determined statistically. Theoretically at a relative pressure of 1 all pores will be filled. In view of determinations being conducted at the normal boiling temperature of the adsorbate the $P_s$ value is equal to 1 atmosphere. The time required for persons skilled in the art to conduct complete adsorption isotherm data determinations by the conventional method of static pressure-volume measurements is approximately one working week (40 hours), with at least a half-day being required to carry out the necessary calculations.

It is a major object of the present invention to obtain the same information as now available by the static pressure-volume method at a materially reduced time requirement for the skilled scientists performing the work.

Another important object of the invention is to supply for the first time relatively complete adsorption-desorption isotherms by a continuous flow process at total pressures of 1 atmosphere or greater, thus making possible avoidance of the experimental difficulties and special skills required for operations with high vacuum technique by the static pressure-volume method.

A related objective of the invention is to obtain solid surface information by providing an apparatus using non-fragile parts, preferably metallic parts, and more preferably corrosion-resistant metal parts such as stainless steel. Such construction is in contrast to the typically elaborate glass-containing equipment used in the prior art, which is prone to difficulties and lost time from breakage and leakage, particularly small leaks which are hard to locate. Thus, in addition to the saving in operating time per sample, there is a saving in time out of operation for equipment due to the stated difficulties.

It is a further object of this invention to provide in a continuous flow process a means of continuously and accurately recording the adsorption-desorption isotherm over the entire range of relative pressure of the adsorbate.

An additional object of this invention is to provide in a continuous flow process a means of determining the adsorption-desorption characteristics of a gas on a solid at comparatively high relative pressure of the adsorbate.

Specific particular objects of this invention are to provide by a continuous flow process methods of obtaining surface characteristics information of solids including complete adsorption isotherms, pore volume and diameter distributions, total pore volumes and surface areas.

In accordance with the present invention a novel method and apparatus are provided to supply information as to surface characteristics of solids and particularly of porous solids. Discussion here will be limited to general distinctions and advantages of the invention over the known art, salient features of which have been considered in the preceding portion of this discussion. Later in the specification a specific embodiment of the invention will be described in detail in connection with an explanation of FIGURE 1, schematic flow diagram, and examples of results achieved will be given to demonstrate the invention's utility.

The present invention is distinguished from all known art in providing a continuous flow method of determining surface characteristics of porous solids, as characterized by a relatively complete adsorption and desorption isotherm. Also unique is use in a continuous flow system of specific constant mixtures of adsorbates and diluents, preferably each of high purity, supplied to the system containing the porous solid at a variation of absolute pressures ranging from slightly over one atmosphere to high pressures.

The invention is advantageously carried out with apparatus constructed of non-fragile parts, preferably metal parts as has been previously discussed. Such non-fragile construction is obviously necessary when the gas mixture is supplied at high pressure. To the best of my knowledge there is no disclosure in the prior art of advantageous use of high pressure flow systems in studies of surface characteristics of porous solids.

As has been indicated the time saving advantage of the present invention is an important one. In accordance with the static method for obtaining data for the BJH calculation, approximately 40 hours are necessary to make the measurements for the complete adsorption isotherm. The present invention reduces the necessary operating time to obtain the data for such an isotherm to about eight hours. In addition a half-day or so of working time is required for calculations as before. As far as use of equipment is concerned, about five times as much work can be done in a given period of time.

Operation with non-fragile metallic equipment in contrast to the prior art high vacuum glass-containing equipment for adsorption isotherms, is also advantageous, as it makes possible handling of the equipment in a relatively routine fashion by less skilled persons than are necessary to carry out the high vacuum glass procedures conventionally used in obtaining data for BJH and BET calculations.

In a particularly favorable embodiment of the invention, as will be discussed subsequently in detail, a mixture is used of an adsorbate gas and a diluent or carrier gas. For example, 2% nitrogen with helium diluent or 10% nitrogen with a helium diluent may be used. Such mixture is split into two streams, a reference stream and a test stream, which pass through pressure reducers. After passing over the porous solid, the test stream is conducted through a second pressure reducer. Both streams then pass to a thermal conductivity cell. Flow rates are such that gas supply from approximately the same portion of the gas mixtures reaches the thermal conductivity cell at the same time from the two streams— in this way any significant error from variation of the reference stream composition as compared to the test stream composition is eliminated.

The total gas pressure, that is operating pressure, in accordance with this invention ranges from slightly over atmospheric to about 200 atmospheres, this high upper limit being particularly suitable when very dilute mixtures of the adsorbate are used or the adsorbate partial pressure is greater than atmospheric. In most cases a total gas pressure range of slightly over atmospheric to 50 atmospheres is preferred.

The preferred concentration of the adsorbate in the feed gas is below a limiting concentration which is defined by the upper limit of linearity of the detecting cell for the particular combination of adsorbate and diluent gases used. In the case of nitrogen and helium with use of a thermal conductivity cell the upper desirable limit for nitrogen is about 50 volume percent.

The combination of higher total pressures and more dilute adsorbate gases may be especially suitable for approaching total pore volume determination in accordance with this invention. For example, 1% nitrogen with helium diluent, with $P/P_s=1$ at liquid nitrogen boiling point would have a gas stream total pressure at saturation of about 1500 pounds.

For mixtures of nitrogen adsorbate and helium diluent with nitrogen partial pressure in the feed gas ranging up to 20 volume percent, a preferred pressure for the gas mixture reaching the sample ranges from 1 to 20 atmospheres. Favorable specific ranges are nitrogen partial pressure of 10 volume percent and a total gas mixture pressure ranging from 1 to 10 atmospheres.

In the nitrogen-helium embodiment of the invention the mixture is passed over the liquid nitrogen cooled sample at a fixed rate and at pressures such that the partial pressure of the nitrogen contacting the sample ranges from a low value to the vapor pressure of liquid nitrogen at its boiling point, that is, its saturation pressure. For a 10% nitrogen in helium mixture the pressure may range to 150 p.s.i.a., assuming the sample is at liquid nitrogen temperature where the vapor pressure as measured by a vapor pressure thermometer is in the vicinity of the atmospheric pressure—in one case 780 mm. of mercury was measured. It is possible to use various binary mixtures besides nitrogen and helium provided they are suitable adsorbent-diluent combinations and the mixtures give results in a linear portion of the detector's response.

To determine the linearity of response for the thermal conductivity cell to the various concentrations of nitrogen in helium, its sensitivity factor was determined by injecting measured volumes of nitrogen into a known nitrogen-helium mixture and recording the response of the cell to the known gas mixtures. Results showed that a thermal conductivity cell shows a linear response to concentrations up to about 50% nitrogen in helium. As the concentration of nitrogen is increased beyond 50%, there is a sharp decrease in sensitivity of the cell. This decrease in sensitivity shows up especially where the relative pressure of nitrogen is about 0.85 and over. As explained elsewhere, in order to obtain complete information on pore-size the determination of adsorption at higher relative pressure is critical.

Consequently, when using a thermal conductivity cell as a detector, the operating gas mixture must be so chosen that rapid desorption at peaks does not result in effluent gas compositions that exceed the range of linear response of the detector. When desorption of nitrogen in nitrogen-helium mixtures causes the concentration of nitrogen in the effluent to approach 50% it is necessary to choose small desorption increments. However, it is more desirable to use initial gas compositions that do not exceed about 20% nitrogen in helium to assure that such instantaneous desorption, as measured at the chart peaks, will not result in effluent gas compositions which exceed about 50%.

Although pre-determined sensitivity factors could be used to evaluate results above 50% nitrogen in helium, there is a decrease in accuracy of measurement when the gas composition exceeds the range of linear response of the detector.

In obtaining adsorption isotherm data by the flow system of this invention, it is usually convenient to control the temperature of the porous solid by immersion of the part of the system containing it in a bath at the boiling point of the adsorbent. Thus nitrogen may be adsorbed at liquid nitrogen temperature, n-butane in boiling n-butane, and carbon tetrachloride in boiling carbon tetrachloride. It may also be desirable to obtain adsorption isotherm data under conditions of higher adsorbate pressure than atmospheric. With the non-fragile flow system of this invention it is possible to make such studies for the first time. For example, at about 35 atmospheres pressure liquefied carbon dioxide boils in an ice bath at 0° C. A study of adsorption of liquid carbon dioxide as compared to solid carbon dioxide might be of interest and could be accomplished with the apparatus of this invention.

Figures are attached to this specification to assist in obtaining an understanding of the invention. A description of one possible embodiment of the invention is given in FIGURE 1. Desorption isotherms for various materials obtained by use of the process of this invention and specifically using the apparatus according to the flow diagram of FIGURE 1 are shown in FIGURES 2, 3, 4, 5 and 6, which will be discussed in connection with examples which will follow. The resulting isotherms developed by this method corresponds closely with those developed by the lengthy conventional static method.

FIGURE 1 is a schematic diagram for an essentially tubular continuous flow apparatus consisting of non-fragile, preferably metallic materials, and more preferably non-fragile, corrosion resistant materials such as stainless steel. The apparatus, which is described herein with reference to a 10% nitrogen in helium gas mixture, consists principally of two distinct parts, namely: (A) the reference stream and (B) the sample stream. The sample stream contains a detachable stainless steel sample tube 11. A constant gas mixture comprising an adsorbate and a diluent is fed to the system at inlet 1. Containers for materials to dry the inlet gas mixture and remove impurities are provided at 2a, 2b and 2c. For example, activated alumina may be used as a drying material. A connection means 3 is provided so that the inlet mixture may be dried before use in the system. The tubing 20 is 0.055″ I.D., ⅛″ O.D. stainless steel tubing. In the reference system, a pressure regulator 4 reduces the pressure to the desired level as read on the pressure gauge 5. Pressure ranges of 0 to about 60 p.s.i.g. should be provided for using the 10% nitrogen in helium mixture. Pressure regulator 8 and pressure gauge 9 regulate the inlet pressure in the sample tube 11. Pressure ranges of 0 to about 160 p.s.i.g. should be provided for with the 10% nitrogen in helium mixture. By-pass control valves 12 and 21 are included to allow for control of the amount of gas mixture through the sample tube. A cold trap 10 is provided for cooling the gas mixture to liquid nitrogen temperature before it enters the sample tube in order to remove impurities from the gas stream. A pressure regulator 13 and a pressure gauge 14 regulate the sample tube outlet pressure. A needle valve 6b permits adjustment of flow through the sample tube. Similarly, a needle valve 6a permits adjustment of flow through the reference system. A rotameter 7 in the reference system indicates flow rate in the range of 0 to 150 ml. per minute, and a rotameter 17 in the sample system indicates flow rate in the range of 0 to 1000 ml. per minute. A thermal conductivity cell 16 is used in conjunction with an electrical bridge to a recording potentiometer. The output 15 from the thermal conductivity cell is varied by an attenuator in the bridge circuit. Gas outlets 18a and 18b from the system are provided. A valve arrangement 19 is used to calibrate various gas streams through the detector.

The sample in the sample tube 11 may be cooled to liquid nitrogen temperature by means of a Dewar flask which can be fitted over the U bend in the tube. The power is supplied to the thermal conductivity cell by a storage battery.

Although the schematic diagram of the apparatus is described for a gas mixture of 10% nitrogen in helium, it is evident that variations in materials and design can be made to adjust the system to other gas mixtures. For example, if the gas mixture contains less than 10% nitrogen to helium, greater sample tube pressures would be necessary to obtain the required relative pressures of nitrogen and suitable pressure regulators and gauges would be required.

The tubing, which is stainless steel in the given embodiment, may be any tubing which would be capable of resisting high or moderately high pressures. In some instances glass or plastic tubing may be used if the desired pressures are not too high.

The size of the sample tube should not be much greater than the size necessary to house the desired sample. Desired sample size would depend on its internal porosity, since the adsorption data must be obtained with a convenient amount of adsorbate. Sample length in the gas stream should be relatively long compared to its cross section.

The use of by-pass control valves 12 and 21 is optional. If a sample with a very large surface area is used, adsorption on the sample will be large and rapid, and the resulting recorded peaks will be difficult to measure accurately. By means of control valves, the amount of gas mixture passing through the sample can be decreased and the adsorption can be controlled so that the resulting peak will be easier to measure.

The use of additional driers such as 2a and 2b and the cold trap 10 are optional depending on the purity of the gas stream.

Adjustments can be made so that it is not necessary to use a reference system such as designated by (A) in the diagram.

Figure 2:
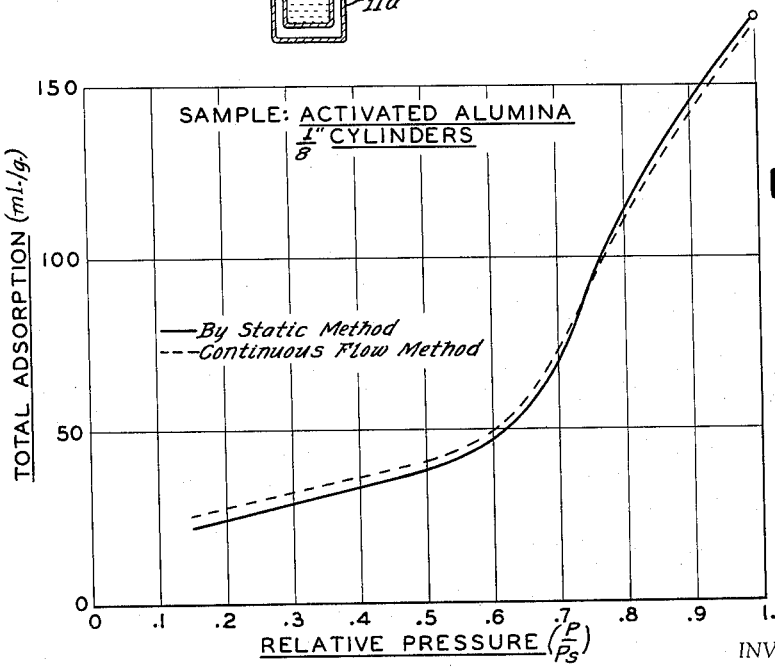

FIGURES 2, 4, 5 and 6 show desorption branches of adsorption isotherms developed by means of the continuous flow method of this invention as compared with those developed by means of the conventional static pressure-volume method. In FIGURE 2 the sample used is activated alumina ⅛" cylinders; in FIGURE 4, ⅛" spheres of activated alumina containing silica; in FIGURE 5, silica gel; and in FIGURE 6, activated granular cocoanut carbon.

Figure 3:
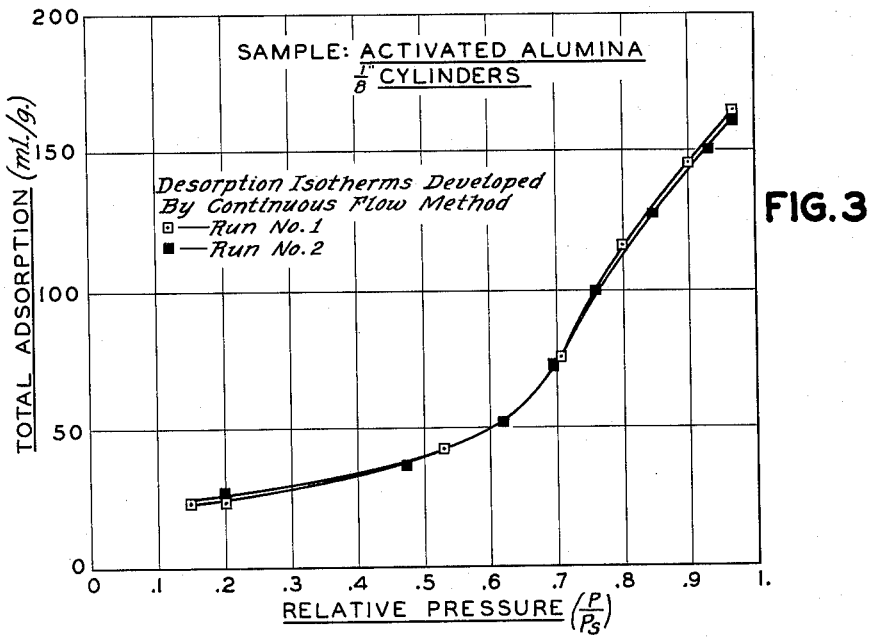

FIGURE 3 shows the close reproducibility of two desorption isotherms developed by means of the continuous flow method of this invention on the same material, activated alumina-⅛" cylinders.

Using apparatus of the type represented schematically in FIGURE 1, isotherms can be developed with a 10% nitrogen in helium gas mixture and a procedure for this is given.

A cleaned sample tube of suitable size, i.e., a size chosen to minimize the volume of the sample tube, is charged with a pre-weighed sample of about 0.5 gram. A small plug of glass wool at each end of the charged sample will prevent sample loss during operation. If a fine powder, which would ordinarily impede gas flow, is to be evaluated, a piece of glass wool is twisted like a wick and threaded through the sample so that it extends into the glass wool plugs on each end.

The sample is degassed before the isotherm is developed. A convenient method of degassing a sample is described herein, other methods are known in the art. After attaching the sample tube, dry helium (dew point=−78° C.) is passed through the sample tube at a flow rate of 5–8 l.p.h. indicated on the rotameter 17. Near atmospheric pressure is maintained in 11 by opening regulator 13 and then regulating 8. In this manner the pressure in the sample tube will be the normal back pressure of the downstream system. The sample is heated to some adequate temperature for drying without altering surface characteristics. For alumina samples a temperature of 320–350° C. for a period of 16 hours is adequate and convenient. After drying, the sample is cooled to room temperature and the helium replaced with a 10% nitrogen in helium stream from a high pressure source (>135 p.s.i.g.).

The adsorption isotherm is now developed by varying the partial pressure of the nitrogen in the sample tube 11 at suitable increments and determining the amount of adsorption at the respective pressures. The pressure is adjusted to indicate 10 p.s.i.g. on gauge 9 by regulating 8. The pressure is adjusted to indicate 9 p.s.i.g. on gauge 14 by regulating 13. The flow through the sample tube is set at 325 ml./minute (STP) by adjusting valve 6b. Flow through the reference side of the system (A) should be adjusted to 40 ml./minute by setting gauge 5 to 1 p.s.i.g. and regulating with valve 6a.

The thermal conductivity cell circuit and the recorder are switched on and the cell current is adjusted to 240 ma. Guides for the attenuator settings for the first adsorption step are:

| Approx. surface area of samples: | Attenuator settings |
|---|---|
| 50–150 | 8 |
| 100–400 | 16 |
| 350–700 | 32 |
| 650–1200 | 64 |

The recorder zero is adjusted to about 10% of full scale using the bridge balanced control with the polarity switch in "Adsorb" position.

When the recorder base line is constant and the instrument settings are correct, a partially filled one liter Dewar flask of liquid nitrogen is slipped over the sample and filled to the brim as quickly as possible. A piece of asbestos paper or some other temperature insulating material may be used as a cover.

An adsorption peak corresponding to the relative pressure in the sample tube will be formed on the chart. The peak area is measured and converted into volume of nitrogen per gram of sample. This represents the adsorption value resulting from the increase of nitrogen relative pressure in the sample tube over the previous pressure—in this case from 0 to about 0.165.

The attenuator is reset to approximately one-eighth the previous reading and the recorder base line adjusted to 10% of full scale. The instrument settings are checked. The liquid nitrogen level is kept constant at all times. The sample pressure is increased to 18 p.s.i.g. using regulator 8 and the instrument settings are re-checked. Settings are not changed while the adsorption peaks are formed. The resulting peak is measured and converted into the adsorption units. A conversion factor is derived from either a direct or relative calibration. In direct calibration peaks of known area created by measured quantities of nitrogen are measured. In relative calibration samples of known pore distribution are used to standardize the peaks. Adsorption values should be tabulated along with corresponding relative pressure values. The adsorption value represented by each peak is added to the preceding peak value to show the total adsorption at each relative pressure point.

The same procedure is followed to obtain the adsorption value at another pressure, increasing the sample pressure to 25 p.s.i.g., but without changing the attenuation. The three adsorption values obtained should provide sufficient data for surface area calculation.

The complete isotherm is determined using convenient increments, to approach but not reach the saturation point. A little experience will aid in predicting the best attenuation setting for each successive adsorption step. Settings should be adjusted to obtain peaks having areas that will afford good sensitivity without being burdensome to measure due to excessive area. If peaks are not in the desired range of area return to the preceding cell pressure, wait for equilibrium in the sample tube, then readjust settings and resume the operation.

To develop the desorption isotherm, the polarity switch is turned to "Desorb" and a similar but reverse procedure is followed. The relative pressure is adjusted down from near saturation to about 0.965, but without changing the attenuator. Measurements are continued down the isotherm at convenient increments to some point beyond the convergence of the adsorption and desorption branches of the isotherm. It is unnecessary to return to the origin because the adsorption and desorption branches are effectively the same below the convergence point. The desorption peak areas are deducted from the total adsorption beginning with the first desorption peak caused by decreasing the sample tube pressure to an equivalent of about 0.965.

The tabulated desorption data including the data below the convergence point of the adsorption-desorption branches can be used to determine the pore-size distribution as described by Barrett, Joyner and Halenda and others.

The invention will be further illustrated by reference to the following specific examples:

EXAMPLE I

A desorption isotherm was developed with a sample of about 0.5 gram of activated alumina—⅛″ cylinders containing about 0.5% $Na_2O$ and having a surface area of about 125 m.²/g. (square meters per gram) using the continuous flow method of this invention. The apparatus and procedure using 10% nitrogen in helium, as described above, was followed.

The sample was degassed overnight (16 hours) at 320° C. in 9 l.p.h. of dry 10% nitrogen in helium. Gas drying consisted of passing the mixture through 400 ml. of activated alumina at 150 p.s.i.g.

Adsorption data were obtained in increments of relative pressure ranging from 0.16 to 0.97, based on an assumed liquid nitrogen vapor pressure of 800 mm. of Hg. After adsorption values were determined at 0.97, the desorption data were obtained as pressure was decreased in similar stages only down to a relative pressure of 0.55, since the adsorption and desorption branches of the isotherm had already converged at a higher relative pressure.

The following Table I shows a tabulation of adsorption values and the corresponding pressure values. Peak areas, given in inches, are converted into the incremental adsorption values in ml./g. The conversion factor, "K," was pre-determined with known nitrogen-helium mixtures.

spond to pore radii to about 100 A. and from .9 to .97 correspond to pore radii ranging from about 100 A. to about 335 A. It is evident therefore that, in order to determine more complete pore-size distribution values, it is necessary to obtain adsorption information at high relative pressures and often at small pressure increments of adsorbate. The data in Table I indicate that such values can be obtained with this method.

For comparison an isotherm was developed with the same material, activated alumina—⅛″ cylinders using a standard static pressure-volume method. The desorption isotherm using the conventional method is indicated by the solid line in FIGURE 2.

The comparative data in FIGURE 2 shows the good agreement of results using the continuous flow method of this invention with those results using a conventional reliable technique.

It has been pointed out that it takes considerably longer to determine surface area and pore-size distribution by the conventional static method as compared with the continuous flow method of this invention.

EXAMPLE II

Using the continuous flow method as described above in Example I re-run tests were performed on the activated alumina—⅛″ cylinders. The purpose of such tests was to show the reproducibility of the tests using the method of this invention.

The desorption isotherms were developed by a procedure corresponding to that used in Example I. The results are plotted in FIGURE 3 and a comparison of the isotherms shows that the tests have good reproducibility.

*Table I*

| P (p.s.i.g.) | $P/P_s$[a] | $Af$[b]$\times$Area (in.²)$\div$K[c] | Incremental adsorption (ml./g.) | Total adsorption (ml./g.) |
|---|---|---|---|---|
| 10 | .16 | 16× 1.98÷1.2 | 26.4 | 26.4 |
| 17.5 | .208 | 1× 2.52÷1.2 | 2.1 | 28.5 |
| 25 | .256 | 1× 2.16÷1.2 | 1.8 | 30.3 |
| 50 | .418 | 4× 2.04÷1.2 | 6.8 | 37.1 |
| 80 | .612 | 2× 8.22÷1.2 | 13.7 | 50.8 |
| 100 | .77 | 2×20.41÷1.2 | 34.0 | 84.8 |
| 120 | .87 | 2×21.78÷1.2 | 36.3 | 121.1 |
| 130 | .93 | 2×13.20÷1.2 | 22.0 | 143.1 |
| 135 | .97 | 2×10.86÷1.2 | 18.1 | 161.2 |
| 133 | .95 | 2× 0.90÷1.2 | 1.5 | 159.7 |
| 130 | .93 | 2× 3.42÷1.2 | 5.7 | 154. |
| 120 | .87 | 2× 4.62÷1.2 | 7.7 | 146.3 |
| 110 | .8 | 2×20.71÷1.2 | 34.5 | 111.8 |
| 100 | .77 | 2× 6.24÷1.2 | 10.4 | 101.4 |
| 85 | .64 | 2×27.24÷1.2 | 45.4 | 56. |
| 70 | .55 | 2× 7.26÷1.2 | 12.1 | 43.9 |
| 50 | .418 | | | |
| 25 | .256 | | | |
| 10 | .16 | | | |
| 0 | 0 | | | |

[a] $P/P_s$=relative pressure of nitrogen=

$$\frac{\text{partial pressure of nitrogen}}{\text{saturation pressure of liquid nitrogen}}$$

[b] Attenuation factor.
[c] Conversion factor (in.² to ml. of gas)/dry wt. sample (grams).

In FIGURE 2, using the data of Table I the calculated total adsorption given in ml./g. is plotted against the corresponding relative pressure of nitrogen. The resulting isotherm is shown by the broken line.

As indicated above, adsorption isotherm data is used to calculate surface characteristics including pore-size distribution. It is of special significance that adsorption values can be ascertained according to this invention, as shown in Table 1, at increments of relative pressure from above .5 to values approaching the saturation pressure of the adsorbate. Reference to tables developed by BJH, Wheeler and others, concerning mean pore radii values which can be related to adsorption data at various pressures, will show that relative pressures of nitrogen ranging to about .5 correspond to mean pore radii values to about 22 A. Relative pressures of nitrogen to .9 corre-

EXAMPLE III

Figure 4:
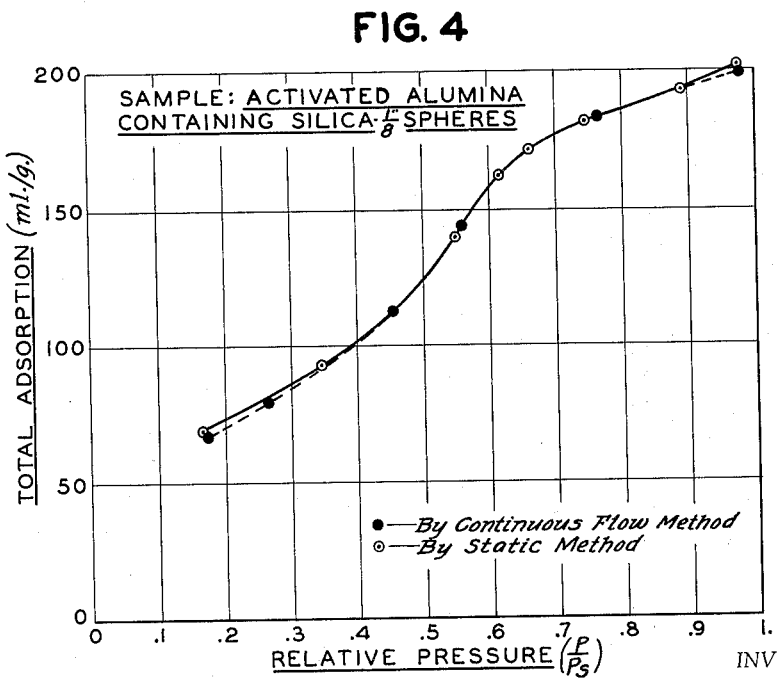

In FIGURE 4 is shown a comparison of desorption isotherms, developed by the static pressure-volume method and the continuous flow method of this invention, for ⅛″ spheres of activated alumina containing about 5.8% $SiO_2$ and 2% $Na_2O$ and having a surface area of about 350 m.²/g.

Figure 5:
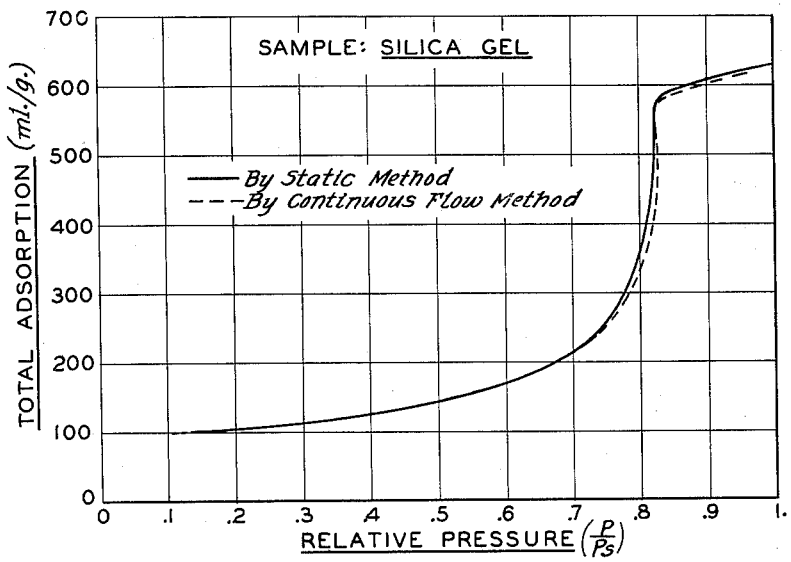

In FIGURE 5 is shown a corresponding comparison for a sample of silica gel with a surface area of about 200 m.²/g.

Figure 6:
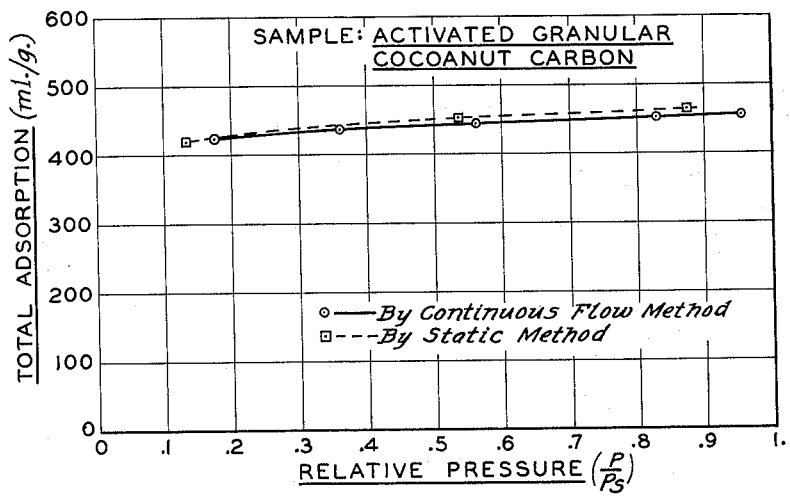

In FIGURE 6 is shown a corresponding comparison for a sample of granular cocoanut carbon with a surface area of about 1000 m.²/g.

FIGURES 4, 5 and 6 show the good agreement between results obtained by the conventional static method and by the continuous flow method of this invention. The agreement is shown for materials having various surface characteristics.

Although specific examples have been given for determination of adsorption isotherms and surface features which may be calculated from them in cases of relatively high surface area solids, the continuous flow method of this invention is not limited to such highly porous solids. It is also suitable with minor modification of the method to obtain such information for low surface area solids. For example, adsorption isotherm information may be obtained for solid materials with surface areas of 1 m.²/g. or even less using a relatively large sample and the thermal conductivity cell at its maximum sensitivity.

The specific descriptions of the flow diagram, calculation of an adsorption isotherm, and comparisons of results of the invention with results of the static method do not by implication exclude other aspects of the invention included in the broader statements as to its nature. It will be obvious to those skilled in the art that many modifications may be made within the scope of the present invention without departing from the spirit thereof, and the invention includes all such modifications.

What is claimed is:

1. A continuous flow method for determining surface characteristics of solid materials, comprising passing a constant gaseous mixture of an adsorbate and a relatively non-adsorbing diluent gas over a temperature-controlled sample of the solid material at a fixed flow rate, varying the pressure of the gaseous mixture to distinct values, measuring the pressure at said values, and analyzing the gaseous effluent corresponding to said pressure values.

2. A method in accordance with claim 1 further characterized in that the pressure of the gaseous mixture is increased to a distinct value whereby adsorption of the adsorbate on the sample selectively takes place and then the pressure of the gaseous mixture is decreased to a distinct value whereby desorption of the adsorbate from the sample takes place, and the quantity of adsorbate adsorbed and desorbed is measured by continuous analysis of the gaseous effluent corresponding to the adsorption and desorption pressure values.

3. A method in accordance with claim 1 wherein the analysis of the gaseous effluent corresponding to said pressure values is effected by sensing and recording the difference in thermal conductivity of the gaseous mixture due to the change in composition thereof.

4. An apparatus for determination of surface characteristics of solids, comprising a tubular means for conducting gases which divides such gases into a reference stream and a test stream passing through a portion of said tubular means containing a solid sample, means for controlling the temperature of said portion containing said solid, means for supplying a constant mixture of an adsorbable gas and a relatively non-adsorbing diluent gas continuously through said tubular means at controlled pressures, a part of said mixture constituting said reference stream and a part constituting said test stream, means for determining the pressure of said test stream passing over said solid, means for varying the pressure of said test stream passing over said solid, and means for determining the extent of adsorption on the solid.

5. A method in accordance with claim 2 in which the adsorbate and diluent gases are present in such proportions that surface characteristics measurements fall within the linearity response of the detector device.

6. A method in accordance with claim 1 in which relatively complete adsorption isotherms of the solid materials are determined.

7. A method in accordance with claim 1 in which the solid materials for which surface characteristics are determined are porous.

8. A method in accordance with claim 7 in which pore size distributions of the porous solid materials are determined.

9. A method in accordance with claim 7 in which total pore volumes of the porous solid materials are evaluated.

10. A method in accordance with claim 1 in which surface areas of the solid materials are determined.

11. A method in accordance with claim 1 in which the total pressure of the gaseous mixture is varied within a range from slightly over atmospheric pressure to about 200 atmospheres.

12. A method in accordance with claim 5 in which the adsorbate partial pressure in the gaseous mixture corresponds to a content of adsorbate therein in the range of 1 to 20 volume percent.

13. A method in accordance with claim 1 in which the constant mixture of gases is passed over the sample at various pressures up to the saturation pressure of the adsorbate.

14. A method in accordance with claim 13 in which the saturation pressure of the adsorbate is controlled close to its pressure at its normal boiling point.

15. A method in accordance with claim 13 in which the saturation pressure of the adsorbate is substantially higher than its normal boiling pressure as a result of maintaining the solid material at a temperature above the normal boiling point of the adsorbate.

16. A method in accordance with claim 1 in which the adsorbate is nitrogen and the diluent is helium.

17. A method in accordance with claim 16 in which the nitrogen partial pressure in the gaseous mixture corresponds to a content of adsorbate therein in the range of 1 to 20 volume percent and the total pressure is in the range of 1 to 20 atmospheres.

18. A method of developing a nitrogen isotherm according to claim 1 that provides sufficient data to enable calculation of pore sizes between 7 and 300 Angstroms radius.

19. An apparatus in accordance with claim 4 in which the materials of the apparatus are non-fragile metallic.

20. An apparatus in accordance with claim 4 in which the adsorbable gas used is nitrogen and the diluent gas is helium.

21. An apparatus for determination of surface characteristics of solids consisting essentially of nonfragile materials comprising a tubular means for conducting gases which divides such gases into a reference stream and a test stream passing through a portion of said tubular means containing an adsorbent porous solid, means for controlling the temperature of said portion containing said solid, means for supplying a dried constant mixture of an adsorbable gas and a relatively non-absorbing diluent gas continuously through said tubular means at controlled pressures, a part of said mixture constituting said reference stream and a part constituting said test stream, means for determining the pressure of said test stream before and after passing over said solid and also means for determining the pressure of said reference stream, means for separately varying the pressure of said test stream and said reference stream, and means for determining the extent of adsorption on said solid.

22. An apparatus in accordance with claim 21 in which the determinations of surface characteristics of solids are made by means of developing adsorption isotherms and information is obtained from the group of pore volume and diameter distributions, total pore volumes and surface areas.

23. An apparatus in accordance with claim 21 in which the non-fragile materials are metallic.

24. An apparatus in accordance with claim 21 in which the adsorbable gas is nitrogen and the diluent gas is helium.

25. An apparatus in accordance with claim 21 in which the total pressure is varied from slightly over atmospheric pressure to a pressure of a plurality of atmospheres.

26. An apparatus in accordance with claim 21 which conducts a gas mixture of about 10 percent nitrogen and 90 percent helium by volume and in which the total pressure of the gas prior to reaching the porous solid ranges between 1 and 10 atmospheres.

27. An apparatus in accordance with claim 21 in which the flow of said test stream and said reference stream are controlled by outlet flow throttle valves.

28. An apparatus in accordance with claim 21 in which changes in the adsorbable gas concentrations as the stream passes over the porous solid are measured in comparison with the reference adsorbable gas concentration by a thermal conductivity cell with suitable electrical connections.

29. An apparatus in accordance with claim 28 in which a continuous record of changes of adsorbable gas concentration in the effluent test stream in comparison with the reference stream adsorbable gas concentration is transmitted from the thermal conductivity cell to a recording potentiometer chart.

30. An apparatus in accordance with claim 29 in which a direct reading of gas adsorption on the porous solid is provided on the recording potentiometer chart.

References Cited by the Examiner

UNITED STATES PATENTS 2,960,870  11/60  Nelson et al. _____ 73—432
3,059,478  10/62  Coggeshall et al. _____ 73—432

OTHER REFERENCES

Article in Analytical Chemistry, vol. 33, No. 7, June 1961, pages 966, 967.

Article in Journal of Research; Natl. Bur. of Stds., vol. 46, No. 1, January 1951, by Loebenstein & Deitz, pages 51–55.

RICHARD C. QUEISSER, *Primary Examiner.*